Nov. 26, 1946.  S. B. CRARY  2,411,710
REGULATOR SYSTEM
Filed Oct. 12, 1943
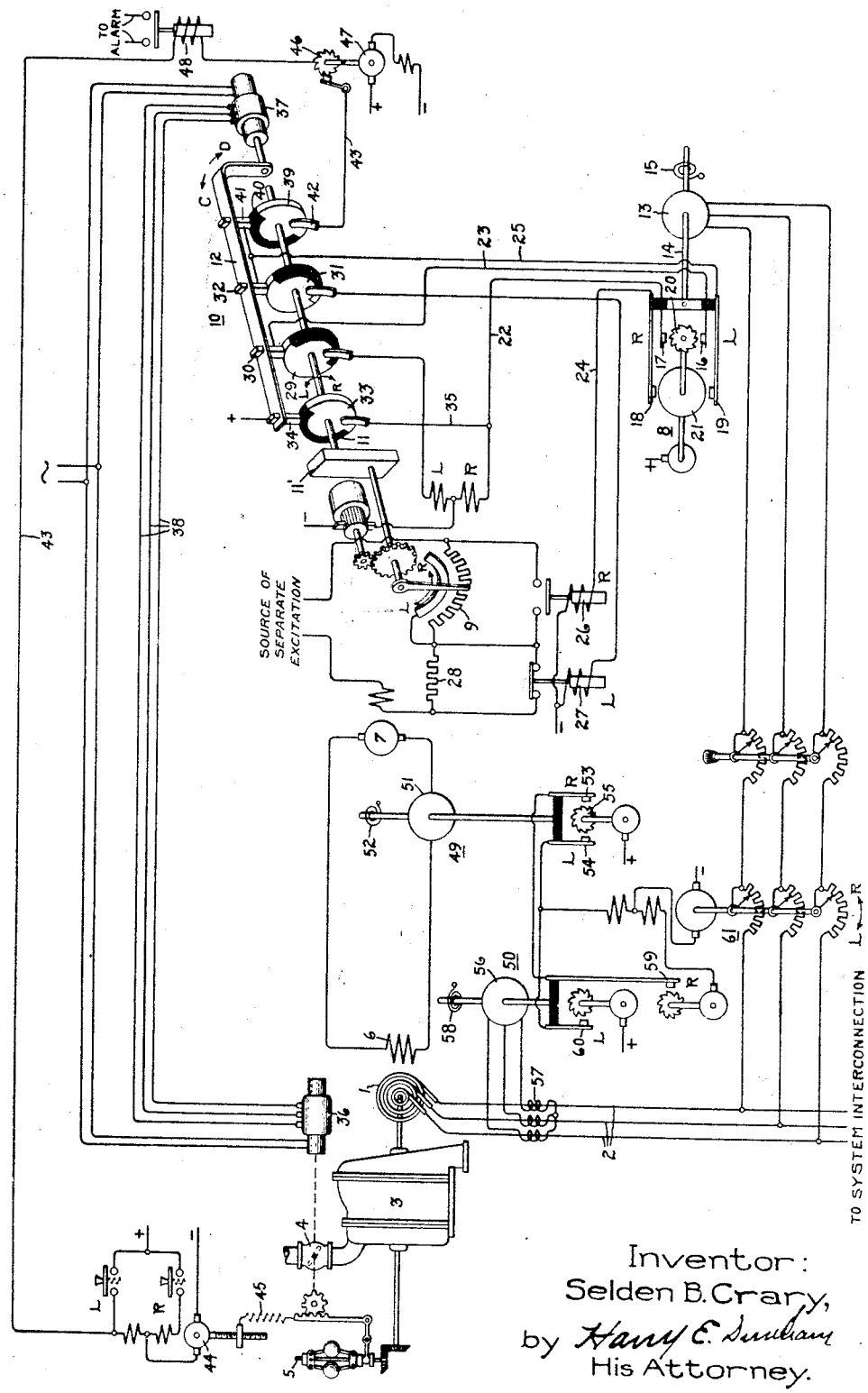
Inventor:
Selden B. Crary,
by Harry E. Dunham
His Attorney.

Patented Nov. 26, 1946

2,411,710

UNITED STATES PATENT OFFICE 2,411,710

REGULATOR SYSTEM

Selden B. Crary, Schenectady, N. Y., assignor to General Electric Company, a corporation of New York Application October 12, 1943, Serial No. 505,955

8 Claims. (Cl. 290—7)

This invention relates to regulator systems and more particularly to improvements in automatic voltage regulator systems for synchronous dynamo-electric machines, particularly synchronous generators.

In Patent 2,259,091, granted October 14, 1941, on a joint application of Louis W. Thompson and myself and assigned to the present assignee, an improved voltage regulator system having what may be called an automatic lower limit is described. By "lower limit" it is meant that the regulator is provided with automatic means for preventing the excitation of the synchronous machine from being lowered far enough by the regulator to cause instability of the regulated synchronous machine. This lower limit of excitation is dependent upon the load on the machine, it being lower at light loads than at heavy loads. Such a lower limit is particularly important in the case of a synchronous machine having a relatively low short circuit ratio. By "short circuit ratio" is meant the ratio of the field current at rated voltage no load to the field current at rated current during short circuit. High short circuit ratio machines are inherently relatively stable but they are large and expensive to manufacture, whereas low short circuit ratio machines are smaller and less expensive but have less inherent stability margin.

Another way of decreasing the size and cost of a synchronous machine is to design it for higher rated power factor operation as this gives better utilization of the material in that the machine is not intended to carry much idle or wattless current. However, when this is done there is increased danger of overheating the machine as a result of its carrying too high a field current, or armature current, or both, in proportion to the actual kilowatt load it is carrying.

In accordance with the present invention there is provided an improved automatic voltage regulator system for synchronous machines which is provided with an automatic upper limit of excitation whereby the heating of the machine is limited to a safe value. This upper limit may conveniently be combined with the regulator system of the above referred to patent so as to provide an automatic voltage regulator system having both upper and lower limits.

In some cases the kilowatt loading of a synchronous machine is not as important as the system voltage, and in accordance with another feature of the present invention there is provided an arrangement for automatically reducing the kilowatt loading of the machine whenever the lowering action of the voltage regulator is limited. In this manner the reduction in kilowatt loading permits a further reduction in excitation so that normal voltage is maintained at the sacrifice of load.

An object of the invention is to provide a new and improved regulator system.

Another object of the invention is to provide an improved automatic regulator system for synchronous dynamo-electric machines with an upper limit to its operation.

A further object of the invention is to provide an improved automatic voltage regulator system for synchronous generators which has both an upper limit and a lower limit.

A still further object of the invention is to provide an improved automatic voltage regulator system for a synchronous generator which is provided with a modified lower limit control for automatically reducing the kilowatt loading of the regulated machine.

The invention will be better understood from the following description taken in connection with the accompanying drawing and its scope will be pointed out in the appended claims.

The single figure of the accompanying drawing illustrates diagrammatically an embodiment of the invention.

As the present invention may readily be combined with the system of my above referred to joint patent with Louis W. Thompson, I will first briefly describe that system.

Referring now to the drawing, there is shown therein by way of example a three-phase synchronous generator 1 which supplies power to an interconnected system over a circuit 2. The generator is driven by a suitable prime mover 3 such, for example, as a steam turbine which is provided with a throttle 4 whose position is controlled by any suitable means such as a conventional centrifugal speed governor 5. The generator has a direct current field winding 6 which is energized by a separately excited direct current exciter 7. The voltage of the generator is controlled by varying its excitation and this in turn is accomplished by varying the excitation of the exciter. To do this an automatic voltage regulator 8 is provided. This regulator may be of any suitable type and may for example be a rheostatic regulator of the type shown in Thompson Patents 1,848,852 or 1,894,837, both of which are assigned to the assignee of the present application. The illustrated regulator is similar to that shown in the first-mentioned patent and it includes a reversible motor-operated rheostat 9.

The degree of excitation of the generator and the amount of load carried thereby are compared by means of a special switching arrangement 10 comprising a first movable member 11 which is operated by the rheostat and a second movable member 12 which is operated by the throttle.

The voltage regulator comprises a main voltage responsive device of any suitable form such as a torque motor 13 connected to respond to the voltage of the generator 1 or circuit 2. As shown for the sake of simplicity, the torque motor terminals are connected directly across the circuit, although it will be understood that in practice potential transformers are usually interposed between the circuit, which is of relatively high voltage, and the torque motor which has a relatively low voltage rating. The torque motor is provided with a shaft 14 and the torque imparted to this shaft by the motor is counterbalanced by a spring 15 so that only when the voltage is normal will a balance exist and the shaft be in its normal position. Fixed to the shaft 14 is a contact-carrying assembly consisting of four insulated yieldably-mounted contacts 16, 17, 18 and 19. Contacts 16 and 17 are on opposite sides of a rotating star wheel contact 20 and contacts 18 and 19 are on opposite sides of a rotating disk contact 21. Contacts 20 and 21 are mounted on the same shaft and are rotated by any suitable means such as a small electric clock type self-starting synchronous motor (not shown). The contacts are so arranged that when the voltage is at its predetermined normal value no contacts are made between them and they are in the positions illustrated in the drawing. If, however, the voltage falls, the torque motor shaft 14 rotates in a counter-clockwise direction, as viewed in the drawing, causing contact 17 to engage contact 20 if the fall in voltage is small and in addition causing contact 18 to engage contact 21 if the fall in voltage is relatively large. Similarly, if the voltage rises above normal, the shaft 14 is turned in a clockwise direction, first causing only contact 16 to engage contact 20 if the voltage rise is small and then causing contact 19 to engage contact 21 if the voltage rise is large. Contact 16 which makes engagement on small increases in voltage is known as the slow lower contact and contact 19 which makes engagement on large increases in voltage is known as the quick lower contact. Similarly, contacts 17 and 18 are known as the slow raise and quick raise contacts respectively. The reason contacts 18 and 19 can engage contact 21 after contacts 16 and 17 engage contact 20 is because of yieldable spring mountings for contacts 16 and 17. These permit further rotation of the shaft 14 and hence further inward movement of the contacts 18 and 19 after the contacts 16 and 17, as the case may be, engage the contact 20. The common contacts 20 and 21 are connected to one side of a suitable source of control current indicated by the + symbol. The slow raise and lower contacts are connected by means of conductors 22 and 23 to the raise and lower terminals of the driving motor for the motor-operated rheostat 9, the common terminal of this motor being connected to the opposite side of the supply source as indicated by the — symbol. The high speed contacts 18 and 19 are connected respectively by means of conductors 24 and 25 to high speed raise and lower contactors 26 and 27. The circuits through these contactors are completed by also connecting the operating windings of the contactors to the — side of the supply source. The high speed raise contactor is a normally open contactor which is connected to short circuit the motor-operated rheostat when it is closed. The high speed lower contactor 27 is normally closed and in this condition is connected to short circuit a resistor 28 connected in series with the motor-operated rheostat in the excitation circuit of the exciter 7.

In order to limit the lowering action of the regulator the low speed lowering circuit controlled by the contact 16 is completed through a pair of contacts 29 and 30 carried respectively by the rotatable members 11 and 12 and the high speed lowering circuit controlled by the contact 19 is completed through a pair of contacts 31 and 32 carried by the rotatable members 11 and 12 respectively. In order to raise the excitation to a safe value for maintaining synchronism as determined by the load on the generator, an auxiliary branch circuit is provided for energizing the low speed raise circuit which is normally controlled by the contact 17. This branch circuit extends from the positive side of the control source through a normally open pair of contacts 33 and 34 carried respectively by the rotatable members 11 and 12 and through a conductor 35 to the conductor 22.

It is usually not convenient to mount the motor-operated rheostat close to the throttle for the prime mover and therefore in order to simplify the mechanical driving connections for the switching means 10, the latter is mounted closely adjacent to either the throttle or the rheostat and is shown by way of example as mounted next to the rheostat so that its rotatable member 11 may be driven by the motor-operated rheostat. As shown, they are interconnected by a speed reducing gear box 11'. The rotatable member 12 which will then usually be fairly far away from the throttle is driven from the throttle by any suitable remote positioning means. One such means is shown in the drawing and consists of a Selsyn transmitter 36 and a Selsyn receiver 37. These two devices are similar in construction, being provided with single-phase rotors energized by any suitable source of alternating current and which are mechanically connected to the throttle 4 and the rotatable member 12 respectively. Their stators are similar to the stators of three-phase induction motors and they are interconnected by a three-phase circuit 38. With this system the rotors of the devices 36 and 37 induce unbalanced voltages in the stator circuit only when the rotors are out of correspondence and these unbalanced voltages cause currents to flow, thereby producing motor torques in the devices. As the rotor position of the device 36 is determined by the position of the throttle, the rotor of the receiver 37 will automatically follow any changes in the position of the transmitter so that the two rotors always occupy corresponding positions with respect to their stators. Thus, the system is the electrical equivalent of a mechanical drive between the throttle and the rotatable member 12.

It may sometimes happen that as a result of the action of the lower limit means for the regulator the voltage of the generator will continue to increase to seriously high values and, in fact, it may be less important to leave the load on the generator undisturbed than it is to limit the voltage. Therefore, in order to prevent the voltage from rising too high under these conditions I provide an additional rotary contact member 39 on the shaft 11 which is provided with an insulating section 40 and which cooperates with a brush 41 operated by the frame 12. The members 31 and 39 may be similar except that they are angularly displaced approximately 180 degrees on the shaft 11 so that whenever the brush 32 is making contact with the contact member 31 the brush 41 is on the insulating segment 40 and whenever the brush 32 is on the insulating part of the member 31 the brush 41 makes contact with the contact disk 39. Thus, current can flow from the brush 41 to a collecting brush 42 which continuously engages the disk 39 whenever the excitation lowering action of the voltage regulator is limited and the insulation 40 prevents the flow of current from the brush 41 to the disk 39 at all times when the lower limit means does not prevent the regulator from lowering the excitation.

The brush 41 is connected to the high speed lowering contact 19 of the regulator by means of the conductor 25 so that the collecting brush 42 is connected to the positive side of the source of control current only when the voltage of the generator is substantially above the normal value held by the regulator, which will ordinarily be the rated value of the machine 1, and only when the voltage lowering action of the regulator is limited by the throttle position responsive means which positions the brush 41 in accordance with the kilowatt load on the machine 1.

Energization of collecting brush 42 is arranged to cause a reduction in the load on the generator 1. This is accomplished by connecting it by means of a conductor 43 to the lowering circuit for a reversible synchronizing motor 44 which controls the tension of a loading spring 45 for the governor 5. The synchronizing motor 44 is shown as a conventional split field type motor whose direction of operation is normally controlled by raise and lower push button switches. By means of these switches the motor may be made to increase or decrease the tension of the spring 45 thereby to raise and lower respectively the speed setting of the governor 5 and hence to raise and lower respectively the loading of the generator 1.

In order to prevent overshooting of this control means a so-called notching arrangement is provided in the form of a rotating cam or star wheel contact 46 which intermittently makes and breaks the circuit through the conductor 43 so that whenever the voltage should fall for any reason the slow raise motor 44 is operated automatically it will operate intermittently instead of continuously. The contact wheel 46 is shown as being driven by a motor 47.

In order to notify the station operator that load is being taken off the machine 1 an alarm relay 48 may be connected in the conductor 43 so that whenever current flows therethrough it will close its contacts to operate any suitable alarm or signal device.

In order to prevent the voltage regulator from overheating the generator 1 in case the voltage of its circuit falls too low it is provided with an automatically operating upper limit. This may be directly responsive to machine temperature or to temperature rise but I prefer to use current response because overcurrent is the primary cause of overheating and as the machine will have rated overcurrent or maximum current values it is more convenient to provide means which will be actuated when these current values are exceeded. As shown, the upper current limit means comprises a pair of regulator heads 49 and 50 generally similar to the automatic voltage regulator head 8, regulator head 49 being responsive to the current in field winding 6 and regulator head 50 being responsive to the armature current of machine 1. Thus, regulator head 49 is provided with a direct current torque motor 51 connected in series with the field winding 6, the torque of this motor being balanced by a spring 52 at the maximum safe value of field current. It is provided with raise and lower contacts 53 and 54 cooperating respectively with a rotating center star wheel contact 55 which is connected to the positive side of the control source.

The armature current responsive regulator head 50 is provided with a three-phase torque motor 56 which is energized in accordance with armature current of the machine 1 by means of suitably connected current transformers 57. The torque of motor 56 is balanced by a spring 58 at the rated maximum safe armature current value of the machine 1 and the torque motor 56 is arranged to operate raise and lower contacts 59 and 60 which cooperate with separate rotating star contact wheels which are insulated from each other. The one which cooperates with the lower contact 60 is connected to the positive side of the source of control current, as shown.

The contacts of the two regulator heads 49 and 50 are so interconnected that when either of the lowering contacts engage their respective star wheel contacts the field current of the generator 6 is reduced. This may conveniently be accomplished by means of a motor-operated rheostat 61 having three resistor plates connected respectively in the phases of the voltage regulator torque motor 13. The two lowering contacts 54 and 60 are connected respectively to the lowering part of the split field winding for the motor which operates the rheostat 61 and the raising part of the split field is connected to the positive side of the source of control current through the two sets of raise contacts of the regulator heads 49 and 50 in series.

The operation of the system is as follows:

Assume that prime mover 3 is being supplied with steam and is driving the generator 1 at rated speed and that the generator 1 is supplying power to the system over circuit 2 at rated voltage. Under these circumstances the parts will be in the positions shown in the drawing. If now the voltage should fall for any reason the slow raise circuit will be closed through the contacts 17 and 20 if the fall in voltage is slight, and in addition the quick raise circuit will be closed through the contacts 18 and 21 if the fall in voltage is substantial. Closure of the slow raise circuit will cause the motor-operated rheostat 9 to operate in a direction to cut out resistance in the exciter field circuit and closure of the high speed raise circuit will cause the high speed contactor 26 to short circuit the motor-operated rheostat thereby producing a large decrease in exciter field resistance and causing a rapid increase in excitation. The raising direction of operation of the motor-operated rheostat is such as to rotate the rotatable member 11 in a clockwise direction, as shown in the drawing. When the voltage returns to normal the raise circuits are broken and the excitation raising operation ceases. If now the voltage becomes higher than normal the slow lowering circuit is closed if the rise in voltage is small and in addition the quick lowering circuit is closed if the voltage increase is large. Closure of the slow lowering circuit through the contacts 16 and 20 reverses the operation of the motor-operated rheostat causing it to insert more of its resistance in the exciter field circuit and causing it to rotate the member 11 in a counterclockwise direction, as viewed in the drawing. Closure of the high speed lowering circuit through the contacts 19 and 21 causes the high speed lowering contactor 27 to open thereby inserting the resistor 28 in the field circuit and quickly reducing the excitation.

It will be observed that as the lowering operation of the motor-operated rheostat continues the contacts 29 and 31 approach an angular position at which they disengage their cooperating contacts 30 and 32 so that when a predetermined angular relation is reached the lowering circuits will be broken by the separation of the contacts by means of insulating pieces set in the contacts 29 and 31. At the same time that this happens the contact 33 will have been rotated to a position in which it is permitted to engage its cooperating contact 34 thus completing a branch circuit for energizing the motor-operated rheostat in the raising direction. Actually, it is preferable to provide a slight interval between the opening of the lowering circuit controlling contacts 20 and the closing of the raise circuit controlling contacts so as to prevent a pumping action of the system.

The value of excitation below which the lowering circuits are rendered inoperative and the low speed raise circuit is rendered operative is determined by the angular position of the rotatable member 12. This is determined by the throttle position which in its turn controls the load carried by the generator. The drive for the member 12 is such that when the throttle is moved in an opening direction so as to increase the load the rotatable member 12 is turned in a clockwise direction, as viewed in the drawing, with the result that the predetermined minimum value of excitation below which the lowering contacts are incapacitated and the low speed raising circuit is rendered operative is increased. Similarly, a closing motion of the throttle causes a counterclockwise rotation of the member 12, thus decreasing the permissible minimum value of excitation.

When the voltage gets high enough to close the high speed lowering contact 19 of the voltage regulator and the load on the generator is too high to allow further reduction in excitation, the circuit will be completed through the brush 41 and the rotating contact 39 to the lowering field winding of the synchronizing motor 44 so as to reduce the speed setting of the governor and thus permit a closing motion of the throttle 4 which will cause the frame 12 to move in the closing direction until eventually the lower limit will be raised sufficiently to permit a decrease in the excitation and consequently a decrease in voltage.

The field and armature currents will normally be below their maximum safe values so that the raise contacts 53 and 59 of the field and armature current responsive units 49 and 50 will normally be closed and consequently the rheostat 61 will normally be turned to its all-in position so that all of its resistance will be inserted in the circuit of the torque motor 13. The motor 61 may either be designed to be energized continuously in a stalled condition or else it may be provided with conventional limit switches for deenergizing it when it reaches its limits of operation. With all of this resistance in the circuit of the torque motor 13 the regulator will tend to hold normal or rated voltage of the generator 1. If now either the field current or the armature current of the machine 1 exceeds its maximum safe value the lower contact 54 or the lower contact 60 will be connected to the positive side of the control circuit so as to energize the motor-operated rheostat 61 in such a manner that it reduces the resistance in the main control circuit of the voltage regulator. This in effect makes the voltage regulator think that the voltage is higher than it actually is so that it closes its lowering contacts and reduces the field current and this action will continue until both the armature current and the field current are reduced to safe values. However, the motor of the rheostat 61 will not reverse so as to raise the setting of the regulator until both the armature and field currents of the main machine are below their maximum safe values.

It will, of course, be obvious to those skilled in the art that a motor-operated rheostat is not essential in that the raise and lower coils of the split field for the motor of the rheostat 61 could be relay coils for controlling the short circuiting of a resistor in a circuit of the torque motor 13, the resistor normally being un-short circuited whenever the field and armature currents get too high. However, the gradual control which is produced by the motor-operated rheostat is preferable.

The value of the resistance of the rheostat 61 is relatively small so that when it is all short circuited the resulting reduction in terminal voltage is also relatively small so that the accompanying reduction in armature current and field current cannot be made to fall to such values as to jeopardize stability. In general, the value of this resistance is so limited as not to allow underexcited leading power factor operation of the generator 1. Also the speed of its motor is made very slow so as not to reduce appreciably the voltage regulator setting during transient faults or momentary disturbances.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a synchronous-to-synchronous electric power system, a synchronous dynamoelectric machine, an automatic voltage regulator responsive to the voltage of said machine for controlling the field current of said machine in a manner to maintain the machine voltage at a predetermined value, and means responsive to an abnormal operating condition of said machine which is associated with dangerous overheating of said machine and cooperating with said voltage regulator for lowering the voltage setting of said regulator below said predetermined value.

2. In a synchronous-to-synchronous electric power system having a synchronous dynamoelectric machine, an automatic voltage regulator responsive to the voltage of said machine for controlling the field current of said machine in a manner to maintain the machine voltage at a predetermined value, and means responsive to machine field current and to machine armature current and coacting with said voltage regulator for lowering the voltage setting of said regulator below said predetermined voltage value whenever either of said currents exceeds a predetermined maximum safe value, said means being operated to restore the voltage setting of said regulator to its normal value when both said currents are less than their respective maximum safe values.

3. In a synchronous-to-synchronous electric power system, a synchronous dynamoelectric machine, an automatic voltage regulator responsive to the voltage of said machine for controlling the excitation of said machine in a manner to maintain the machine voltage substantially at a predetermined value, means for preventing said regulator from lowering the excitation of said machine below predetermined minimum safe stable values which vary in accordance with the kilowatt loading of said machine, and means responsive to a predetermined overvoltage condition of said machine for lowering the kilowatt loading of said machine.

4. In a synchronous-to-synchronous electric power system, a synchronous dynamoelectric machine, an automatic voltage regulator responsive to the voltage of said machine for controlling the excitation of said machine in a manner to maintain the machine voltage substantially at a predetermined value, means for preventing said regulator from lowering the excitation of said machine below predetermined minimum safe stable values which vary in accordance with the kilowatt loading of said machine, means for raising the excitation of said machine to said minimum values independently of said regulator, and means responsive to a predetermined overvoltage condition of asid machine for lowering the kilowatt loading of said machine.

5. In a synchronous-to-synchronous electric power system, a synchronous generator, a prime mover for said generator, a speed governor for said prime mover, means for adjusting the speed setting of said governor for varying the kilowatt loading of said generator, an automatic voltage regulator for said generator for controlling the field current of said generator so as to maintain a predetermined normal generator voltage, means for incapacitating the field current lowering action of said regulator when the field current is below predetermined maximum safe stability values which are proportional to the kilowatt load on said generator, and means responsive to a predetermined overvoltage condition of said generator for actuating said speed setting adjusting means so as to reduce the kilowatt loading of said generator.

6. In a synchronous-to-synchronous electric power system, a synchronous generator having a short circuit ratio of less than unity, a prime mover for said generator, a speed governor for said prime mover, means for adjusting the speed setting of said governor for varying the kilowatt loading of said generator, an automatic voltage regulator for said generator for controlling the field current of said generator so as to maintain a predetermined normal generator voltage, means for incapacitating the field current lowering action of said regulator when the field current is below predetermined maximum safe stability values which are proportional to the kilowatt load on said generator, means for raising the field current to said predetermined minimum safe stability values independently of the action of said regulator, and means responsive to a predetermined over-voltage condition of said generator for actuating said speed setting adjusting means so as to reduce the kilowatt loading of said generator.

7. In a synchronous-to-synchronous electric power system, a synchronous generator, a prime mover for said generator, a speed governor for said prime mover, means for adjusting the speed setting of said governor for varying the kilowatt loading of said generator, an automatic voltage regulator for said generator for controlling the field current of said generator so as to maintain a predetermined normal generator voltage, said generator having predetermined maximum safe values of field current and armature current, means for incapacitating the field current lowering action of said regulator when the field current is below predetermined maximum safe stability values which are proportional to the kilowatt load on said generator, means responsive to a predetermined overvoltage condition of said generator for actuating said speed setting adjusting means so as to reduce the kilowatt loading of said generator, and means responsive to both of said currents for lowering the voltage setting of said regulator whenever either of said currents exceed their respective predetermined maximum safe values and for restoring the voltage setting of said regulator to its normal value whenever both of said currents are below their respective predetermined maximum safe values.

8. In a synchronous-to-synchronous electric power system, a synchronous generator having a short circuit ratio of less than unity, a prime mover for said generator, a speed governor for said prime mover, means for adjusting the speed setting of said governor for varying the kilowatt loading of said generator, an automatic voltage regulator for said generator for controlling the field current of said generator so as to maintain a predetermined normal generator voltage, said generator having predetermined maximum safe values of field current and armature current, means for incapacitating the field current lowering action of said regulator when the field current is below predetermined maximum safe stability values which are proportional to the kilowatt load on said generator, means for raising the field current to said predetermined minimum safe stability values independently of the action of said regulator, means responsive to a predetermined overvoltage condition of said generator for actuating said speed setting adjusting means so as to reduce the kilowatt loading of said generator, and means responsive to both of said currents for lowering the voltage setting of said regulator whenever either of said currents exceeds their respective predetermined maximum safe values and for restoring the voltage setting of said regulator to its normal value whenever both of said currents are below their respective predetermined maximum safe values.

SELDEN B. CRARY.